United States Patent [19]

King

[11] 4,193,321
[45] Mar. 18, 1980

[54] CAM ARRANGEMENT
[75] Inventor: Alan M. King, Westmount, Canada
[73] Assignee: Vendking International Ltd., Greenfield Park, Canada
[21] Appl. No.: 792,658
[22] Filed: May 2, 1977
[51] Int. Cl.$^2$ ............................................. F16H 53/00
[52] U.S. Cl. ........................................ 74/567; 74/432
[58] Field of Search ................. 74/567, 431, 432, 433, 74/569

[56] References Cited
U.S. PATENT DOCUMENTS

| | | | |
|---|---|---|---|
| 1,943,118 | 1/1934 | Holmes | 74/567 |
| 2,007,246 | 7/1935 | Goldberg et al. | 74/567 |
| 2,521,301 | 9/1950 | Morrison | 74/567 |
| 2,857,777 | 10/1958 | Porter | 74/432 |

*Primary Examiner*—Kenneth Dorner
*Attorney, Agent, or Firm*—Hill, Van Santen, Steadman, Chiara & Simpson

[57] ABSTRACT

This invention relates to a cam arrangement which includes a cam means, having a camming surface, and a first end face, and a cam support means, having a first end face. The two end faces are disposed adjacent to and in contact with each other, and means are provided for movably locking the cam means with the support so that, to a controlled extent, relative motion between the cam means and the support means is possible. In one embodiment, the means for movably locking comprises a protrusion on the end face of the cam and a mating recess on the end face of the support, the width of the recess being greater than the width of the protrusion, so that motion of the cam means relative to the support means, to the extent of the difference in widths, is possible.

5 Claims, 9 Drawing Figures

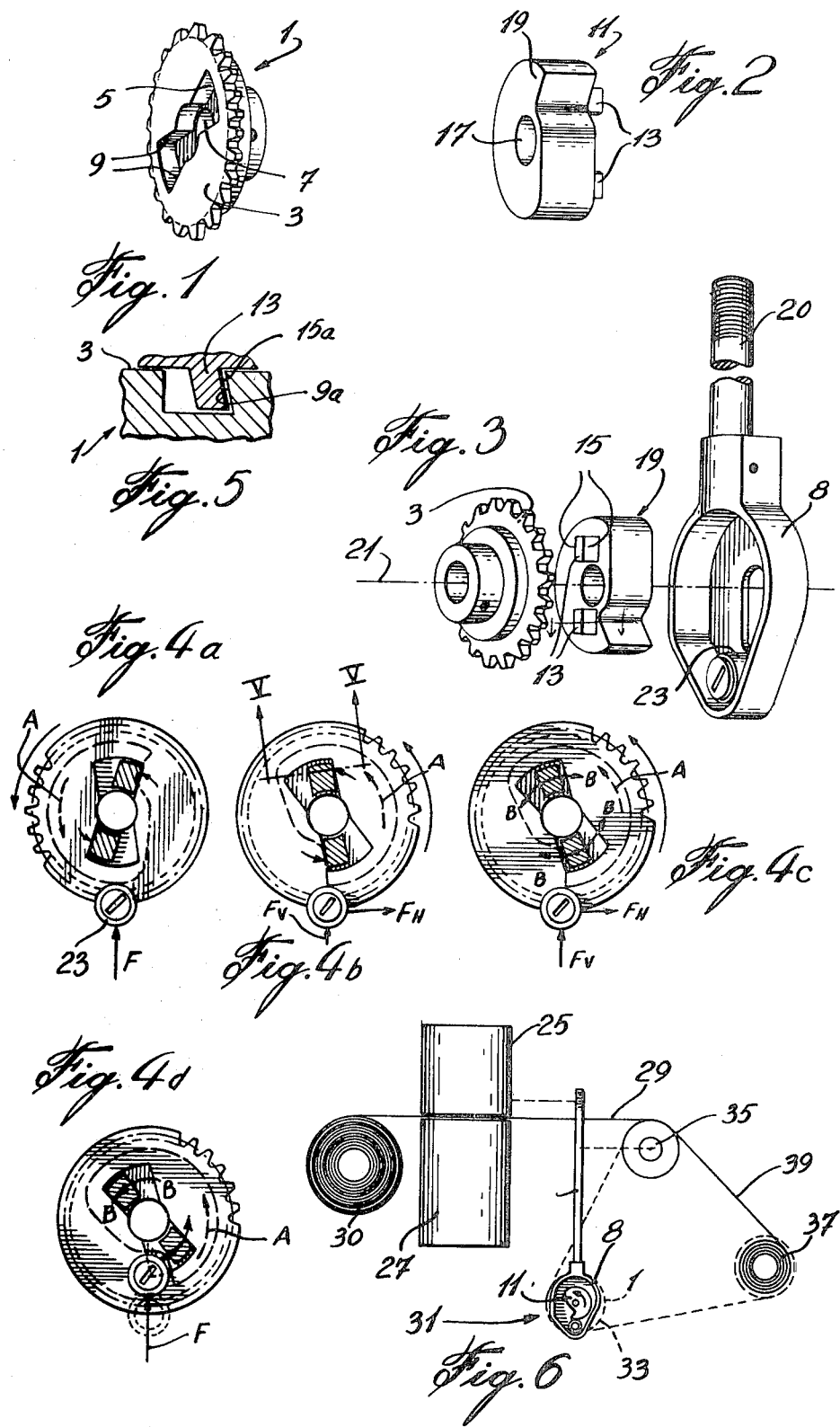

CAM ARRANGEMENT

BACKGROUND OF THE INVENTION

1. Field of the Invention

This invention relates to a novel cam arrangement which includes a cam means and a support means. More specifically, this invention relates to such an arrangement in which the cam means is movable, to a controlled extent, relative to the support means.

This invention also relates to a coffee brewer using the novel cam means and support arrangement.

2. Discussion of the Prior Art

Cam and support means, such as sprocketed arrangements are well known in the art. For the most part, the cams have a peripheral side surface, on which a roller can roll. The cross-sectional shape of the peripheral surface includes a portion which is substantially a semicircle. One end of the semicircle is joined to a substantially straight inwardly directed line, and the other end of the straight line is joined, by a smooth continuation, to the other end of the semicircle.

In the operation of the cam arrangement, the roller is displaced along the peripheral surface of the cam, either by movement of the cam or by movement of the roller. The direction of motion of the roller is from the smooth portion towards the straight line portion over the semicircular portion. There is an abrupt change of direction of motion of the roller when the roller passes the end of the semicircular portion and engages the straight line portion. The abrupt change of motion is used to initiate a change in condition or the starting or stopping of an activity.

Although the change of motion is abrupt, it is far from instantaneous as the roller must roll over the edge of the surface joining the end of the semicircle with the straight line portion, and for some purposes, the time consumed in the rolling over the edge makes the reaction time of the cam arrangement too slow.

One of the areas in which the cam arrangement is too slow is in a coffee brewing machine of the type described in U.S. Pat. No. 3,565,641, King, issued Feb. 23, 1971, and assigned to the assignee herein (incorporated herein by reference). In this machine, a brewing chamber, in the form of a cylinder, is disposed on top of a second chamber, also cylindrical. The floor of the brewing chamber comprises a filter paper which is moved on a roll to present a clean portion for each new cup of coffee to be brewed. After the coffee is brewed in the brewing chamber, and then expelled therefrom, a residue of coffee grounds remains on the filter surface.

When the brewing process is complete, the brewing chamber is lifted vertically upward, and the filter paper is moved on its roll to remove the used filter sheet, along with the residue of coffee grounds, away from the brewing area, and to place a fresh sheet of filter paper in the brewing area. The timing of the lifting of the brewing chamber and the start of movement of the filter roll is governed by a cam and roller arrangement, and, for many reasons, the same motor which drives the cam also drives the filter roll.

With the above-described arrangement, there is the problem that the roll of filter paper begins to move before the brewing chamber is completely lifted. Accordingly, some coffee grounds on the used filter may be caught by the bottom of the brewing chamber, and they may remain stuck to the brewing chamber.

The action of lifting of the brewing chamber is initiated when the roller of the cam and roller arrangement engages the straight line portion, and the slowness of the lifting is due to the slow speed of the cam, and the radius of the roller.

SUMMARY OF THE INVENTION

It is therefore an object of the invention to provide a cam arrangement of the type described wherein the reaction time is decreased.

It is a more specific object of the invention to provide such an arrangement in which the rolling over the edge time is decreased.

It is an even more specific object of the invention to provide such an arrangement wherein the cam means is movably locked against the cam support means whereby the cam means is movable, to a controlled extent, relative to the cam support means, whereby to reduce the rolling over the edge time of the arrangement.

In accordance with the invention, a cam arrangement comprises: cam means having a peripheral camming surface and a first end face; cam support means having a first end face; said first end face of said cam means being adapted to be disposed adjacent to and in contact with said first end face of said cam support means; means for movably locking said cam means with said cam support means with said end faces adjacent each other; whereby to provide, to a controlled extent, relative motion between said cam means and said cam support means.

Said means for movably locking preferably comprises a protrusion in a respective one of said first end faces and a mating recess in the other one of said first end faces, the width of said recess being greater than the width of said protrusion.

Said support means may comprise a sprocket arrangement.

In a preferred embodiment, said means for movably locking comprises: a recess in the first end face of said support means; a mating protrusion on the first end face of said cam means; the width of said recess being greater than the width of said protrusion; said protrusion being adapted to be inserted in said recess.

Both said cam means and said support means each comprise a shaft receiving hole; said protrusion comprising two portions, each portion extending radially outward from the shaft receiving hole of said cam means and in a substantially straight line with each other; said recess comprising two portions, each portion extending radially outward from the shaft receiving hole of said support means and in a substantially straight line with each other.

One side wall of each said recess is sloped relative to the bottom surface thereof, and each side wall of each said protrusion, adjacent each said one side wall of said recess, is matchingly sloped.

From another aspect, the invention relates to a cam and roller arrangement comprising: a housing; cam means having a peripheral camming surface and a first end face disposed in said housing; cam support means comprising a sprocket arrangement and having a first end face; said first end face of said cam means being disposed adjacent to and in contact with said first end face of said sprocket; a shaft receiving hole in each of said cam means, said sprocket and said housing, said shaft receiving holes being in alignment; a shaft extending through said shaft receiving holes; a roller, disposed in said housing, to roll on said peripheral surface of said cam means; and means for movably locking said cam means with said cam support means with said end faces adjacent each other; whereby to provide, to a controlled extent, relative motion between said cam means and said cam support means.

The invention further relates to a coffee brewing machine of the type which includes a cylindrical brewing chamber, and a second cylindrical chamber disposed below said brewing chamber; means for moving said brewing chamber vertically upward away from said second chamber, and means for initiating the action of said means for moving said brewing chamber; a roll of filter paper having a portion thereof disposed between said chamber, means for moving said filter paper, and means for initiating action of said means for moving said filter paper; said machine comprising: the cam and roller arrangement as above-defined, said arrangement further comprising a rod extending from said housing; said rod being connected to both said means for initiating; whereby, when said cam reaches its actuating position both said means for initiating will be actuated to thereby initiate action in both said means for moving.

BRIEF DESCRIPTION OF THE DRAWINGS

The invention will be better understood by an examination of the following description, together with the accompanying drawings, in which:

FIG. 1 is a perspective view of the cam support means in accordance with the invention;

FIG. 2 is a perspective view of the cam means in accordance with the invention;

FIG. 3 is an exploded view of the cam means and the cam support means mounted on a shaft in a housing;

FIGS. 4(a) to 4(d) are schematic drawings illustrating the operation of the inventive arrangement;

FIG. 5 is a section through V—V in FIG. 4(b); and

FIG. 6 is a schematic drawing of a coffee brewing machine illustrating how the invention would be used in the coffee brewing machine.

DETAILED DESCRIPTION OF THE DRAWINGS

Illustrated generally at 1 in FIG. 1 is a cam support means. In the drawings, this is shown as a sprocket and such a support would be used when the cam is rotated relative to a roller by a chain drive. If a belt drive were used, then the support would, of course, not have to be sprocketed and if the roller were moved relative to a fixed position cam, then the support would not even have to be circular in shape. It will therefore be clear that the novelty in the present invention does not reside in the provision of a cam support, or the peripheral shape thereof.

The support includes an end face 3 in which is included, in accordance with the invention, a recess 5. The recess is disposed on either side of shaft hole 7, equal portions of the recess extending radially outward along a common diameter from the shaft hole, i.e. in a substantially straight line.

Each half of the recess is generally four sided in cross-section and includes side edges 9 which flare outwardly from the shaft hole 7.

The cam means, illustrated generally at 11 in FIG. 2, includes protrusions 13 having side walls 15. The protrusions are also disposed on either side of shaft hole 17, and they extend radially outward from the shaft hole along a common diameter, i.e., in a substantially straight line.

As can be seen in FIG. 5, one of the side walls 9a of the recess is sloped forwardly. As can be seen in the same figure, the adjacent side wall 15a of the protrusion 13 is matchingly sloped to the side wall 9a so that, in operation, the protrusion 13 will be locked in the recess as will be discussed below. The other side walls of both the protrusion and the recess can be straight (as shown in the recess) or sloped (as shown on the protrusion).

The cam and support means are mounted for rotation on a common shaft 21, as shown in FIG. 3, with end face 3 of the support adjacent to and in contact with end face 19 of the cam means. The protrusions 13 are inserted in the recess 5, and the dimensions of 5 and 13 are such that the recess is wider than the protrusions, i.e., the spacing between side edges 9 is greater than the spacing between side walls 15. Because of this arrangement, the cam means is movable relative to the support and vice versa, to the extent of the difference in width. The cam and support arrangement are preferably mounted in a housing 8 which includes a roller 23 and a rod 20.

It will, of course, be appreciated that the arrangement illustrated is not the only arrangement which will permit relative movement as between the cam means and the support. Thus, this objective would be equally obtained if the recess were on the cam means and the protrusions on the support. Again, the recess and protrusion could extend on only one side of the shaft hole, or there could be a plurality of more than two recesses and protrusions, and these could be equally or unequally spaced. The only requirement is that the cam means be movably locked with the support so that, over the greater portion of the path of travel, the cam means will move with the support, while at a predetermined position, the cam will move relative to the support, or vice versa, for a controlled extent only.

To understand how the arrangement works, reference is had to FIG. 4:

In FIG. 4, it is assumed that the cam is rotating in the direction of the arrow A (counterclockwise) relative to a fixed roller 23. A force F is shown to be acting on the roller to push it up against the peripheral surface of the cam means. Of course, with the cam rotating, the force is actually applied on the cam means to force it upwardly against the roller, but the effect is the same as shown in FIG. 4, and the operation can be more easily seen by placing the force against the roller.

In 4(a), the roller is adjacent the semicircular portion of the peripheral surface of the cam. The right hand wall of the top protrusion is adjacent the right hand edge of the top recess, and the left hand wall of the bottom protrusion is adjacent the left hand edge of the bottom recess. Because of the matching slopes of walls 9a and 15a, as seen in FIG. 5, the protrusion will be locked into the recess and, accordingly, the cam means will be locked to the support. In order to effect such a locking action, it will of course be appreciated that the walls of both the protrusion and recess which must be sloped are the walls which are upstream considering the direction of travel of both the recess and the protrusion. The side walls of the recesses push against the corresponding walls of the protrusions to push the protrusions to follow the motion of the recesses.

As the protrusions are intimately associated with the cam means, and the recesses are intimately associated with the support, the cam means will also, at this time, follow the motion of the support.

This situation continues in FIG. 4(b), however, we now consider that the force F has a vertical component $F_v$ and a horizontal component $F_h$. With the roller being adjacent the edge of the semicircular portion of the cam, the force $F_h$ starts to push the cam to the left (in the counterclockwise direction). As there is no similar force on the support, the support will not exhibit a similar counterclockwise motion.

Because of the dimensional relationships between the protrusions and the mating recesses, the protrusions will be free to similarly move in a counterclockwise direction relative to their mating recesses as shown in FIG. 4(c). The amount of motion is limited to the difference in widths.

The relative motion will continue until the cam is pushed out of the way and the roller can be moved up as shown in FIG. 4(d). In one embodiment, the recess can be made just big enough to accommodate this motion on the part of the cam. Of course, the recess can be made wider. In any case, because the protrusion can move only within the confines of the recess, only a limited extent of relative motion is possible.

As can be seen, with the inventive arrangement, the rolling over the edge time is virtually eliminated as it is no longer necessary for the roller to roll over the edge of the cam. Instead, when the roller approaches the edge, the cam means is pushed away, and the roller can move up (or the cam means can fall down) very quickly. Accordingly, the objectives herein in this regard are met with the illustrated arrangement.

To illustrate how the invention can be used in a brewing machine as taught in U.S. Pat. No. 3,565,641, reference is had to FIG. 6 which illustrates, very schematically, pertinent parts of the brewer. Referring to FIG. 6, the brewer includes brewing chamber 25 and second chamber 27. Both chambers are cylindrical, and the brewing chamber is disposed on top of the second chamber and is movable vertically upward away from the second chamber.

Between the chambers is a filter 29 which is carried on, and moved by, filter roll 30. Cam and rod arrangement 31 includes the rod 32 and sprocket drive 33. The rod is shown connected to the chamber 25 and to shaft 35, which is the drive shaft for the filter roll, to indicate that the cam and rod arrangement initiates the action of lifting the brewing chamber and causing the filter tape with spent grounds to be advanced out of the brew area. Motor 37, and chain 39 provide the drive for both 33 and 35. Filter 29 normally lies loose on the shaft 35, and it is caused to move by providing a force which pushes it against the shaft.

With the previous arrangement, when the roller approached the actuating edge of the cam, the brewing chamber began to rise. At the same time, a cylinder, disposed above the shaft 35, pressed down on the filter paper 29 so that the filter paper was engaged by the shaft 35 causing the filter paper to move. As mentioned above, the rise time of the brewing chamber was slow due to the above mentioned delaying effect. With the present cam arrangement, this delay is virtually eliminated so that the brewing chamber rises very quickly thus providing an improvement over the prior art.

Although several embodiments were above discussed, this was for the purpose of illustrating, but not limiting, the invention. Various modifications, which will come readily to the mind of one skilled in the art, are within the scope of the invention as defined in the appended claims.

I claim:
1. A cam arrangement comprising:
   cam means having a peripheral camming surface with a variable radius including an abrupt change thereon and a first end face;
   cam support means having a first end face;
   said first end face of said cam means being adapted to be disposed adjacent to and in contact with said first end face of said cam support means;
   means for movably locking said cam means with said cam support means with said end faces adjacent each other;
   whereby to provide, to a controlled extent, relative motion between said cam means and said cam support means;
   characterized in that said means for movably locking comprises:
   a recess in the first end face of said support means;
   a mating protrusion means on the first end face of said cam means;
   the width of said recess being greater than the width of said protrusion means;
   said protrusion means being adapted to be inserted in said recess;
   and wherein both said cam means and said support means each comprise a shaft receiving hole;
   said protrusion means comprising two portions, each portion extending radially outward from the shaft receiving hole of said cam means and in a substantially straight line with each other;
   said recess comprising two portions, each portion extending radially outward from the shaft receiving hole of said support means and in a substantially straight line with each other.
2. A cam arrangement as defined in claim 1 wherein said support means comprises a sprocket arrangement.
3. A cam arrangement as defined in claim 1 wherein one side wall of each said recess is sloped relative to the bottom surface thereof, in the direction of drive of said cam, and each side wall of each said protrusion portion, adjacent each said one side wall of said recess, is matchingly sloped.
4. A cam and roller arrangement comprising:
   a housing;
   cam means having a peripheral camming surface and a first end face disposed in said housing;
   cam support means comprising a sprocket arrangement and having a first end face;
   said first end face of said cam means being disposed adjacent to and in contact with said first end face of said sprocket;
   a shaft receiving hole in each of said cam means, said sprocket and said housing, said shaft receiving holes being in alignment;
   a shaft extending through said shaft receiving holes;
   a roller, disposed in said housing, to roll on said peripheral surface of said cam means; and
   means for movably locking said cam means with said cam support means with said end faces adjacent each other;
   whereby to provide, to a controlled extent, relative motion between said cam means and said cam support means;
   characterised in that said means for movably locking comprises:
   a recess in the first end face of said support means;

a mating protrusion means on the first end face of said cam means;

the width of said recess being greater than the width of said protrusion means;

said protrusion means being adapted to be inserted in said recess;

and wherein both said cam means and said support means each comprise a shaft receiving hole;

said protrusion means comprising two portions, each portion extending radially outward from the shaft receiving hole of said cam means and in a substantially straight line with each other;

said recess comprising two portions, each portion extending radially outward from the shaft receiving hole of said support means and in a substantially straight line with each other.

5. A cam arrangement as defined in claim 4 wherein one side wall of each said recess is sloped relative to the bottom surface thereof, in the direction of drive of said cam, and each side wall of each said protrusion portion, adjacent each said one side wall of said recess, is matchingly sloped.

* * * * *